United States Patent
Shimada et al.

(10) Patent No.: US 6,623,789 B2
(45) Date of Patent: Sep. 23, 2003

(54) METHOD FOR FABRICATING A MAGNETIC RECORDING MEDIUM

(75) Inventors: Yutaka Shimada, Sendai (JP); Osamu Kitakami, Sendai (JP); Satoshi Okamoto, Sendai (JP); Tomoaki Sakurai, Wataricho (JP)

(73) Assignee: Tohoku University, Sendai (JP)

( * ) Notice: Subject to any disclaimer, the term of this patent is extended or adjusted under 35 U.S.C. 154(b) by 0 days.

(21) Appl. No.: 10/178,592

(22) Filed: Jun. 25, 2002

(65) Prior Publication Data

US 2003/0049368 A1 Mar. 13, 2003

(30) Foreign Application Priority Data

Jun. 26, 2001 (JP) .......................................... 2001-192638

(51) Int. Cl.[7] ................................................. B05D 5/12
(52) U.S. Cl. ........................ 427/130; 427/131; 427/132; 427/380; 427/383.1; 427/404
(58) Field of Search ................................. 427/130, 131, 427/132, 380, 383.1, 404

(56) References Cited

U.S. PATENT DOCUMENTS 5,374,450 A * 12/1994 Sato et al. ................... 427/130
6,169,688 B1 * 1/2001 Noguchi ....................... 365/171

OTHER PUBLICATIONS

C. P. Luo et al., "Nanostructured FePt:$B_2O_3$ Thin Films with Perpendicular Magnetic Anisotropy," *Applied Physics Letters*, vol. 77, No. 14, pp. 2225–2227, Oct. 2000.

* cited by examiner

Primary Examiner—Bernard Pianalto
(74) Attorney, Agent, or Firm—Oliff & Berridge, PLC

(57) ABSTRACT

A first thin film including at least one transition metal selected from the group consisting of Co, Fe and Ni, and a second thin film including at least one platinum group element selected from the group consisting of Pt and Pd are prepared. Then, a multilayered structure where said first thin film and said second thin film are stacked is formed. Then, the multilayered structure is heated at the same time or after the formation of said multilayered structure, thereby to counter-diffuse constituent elements of said first thin film and said second thin film and alloy said at least one transition metal and said platinum group element.

38 Claims, No Drawings

METHOD FOR FABRICATING A MAGNETIC RECORDING MEDIUM

BACKGROUND OF THE INVENTION

1. Field of the Invention

This invention relates to a method for fabricating a magnetic recording medium.

2. Description of the Prior Art

With the development of IT technology, high density recording technique is desired in order to record a large amount of information. Particularly, in the magnetic recording field where a large amount of information must be recorded with high precision, a high performance medium is strongly desired.

As of now, Co—Cr based alloy is utilized for such a high density recordable medium. In such a Co—Cr based alloy, ferromagnetic fine particles made of Co—Cr based alloy containing Co as main composition are precipitated in a matrix of non-magnetic Co—Cr based alloy containing Cr as main composition. In this case, one recording unit defined as one bit is composed of an assembly of the fine particles, and then, reduction of recording noise is realized by clear boundary between the adjacent bits and the recording resolution an be improved.

In order to achieve high density recording, however, it is required that the size of each particle made of Co—Cr based ferromagnetic alloy is reduced to obtain high resolution and low recording noise. It is also required that the magnetic intersection between the particles is removed.

If the size of each Co—Cr based ferromagnetic particle is reduced down to 10–20 nm, the thermal agitation to each particle becomes larger than the magnetic energy so that the ferromagnetic property is diminished, which is called as "super paramagnetism phenomena". In this point of view, attempts to seek for research and develop a new high anisotropy magnetic material in place of the Co—Cr based alloy have been made.

As a result, (Fe, Co, Ni)—(Pt, Pd) alloy was developed as a high anisotropy magnetic material. The alloy has a magnetic anisotropy energy about tenfold as large as that of the Co—Cr alloy as mentioned above if the alloy has an ordered phase ($L1_0$ phase). In order to obtain (Fe, Co, Ni)—(Pt, Pd) films of ordered phase, the alloy is deposited on a substrate by vacuum deposition or sputtering, and thereafter, thermally treated at 600–700° C.

In such a high temperature thermal treatment, however, the crystal gains of the (Fe, Co, Ni)—(Pt, Pd) alloy grow and increase in size, so that the high density recording media can not be realized even by utilizing the (Fe, Co, Ni)—(Pt, Pd) alloy. Moreover, the substrate on which the alloy is deposited is thermally deformed, causing many obstacles in the subsequent fabrication process.

SUMMERY OF THE INVENTION

It is an object of the present invention to provide a new high density magnetic recording medium.

In achieving the above object, this invention relates to a method to fabricate a magnetic recording medium, comprising the steps of:

preparing a first thin film layer including at least one transition metal selected from the group consisting of Co, Fe and Ni, and a second thin film layer including at least one platinum group element selected from the group consisting of Pt and Pd, forming a multilayered structure where the first thin film layer and the second thin film layer as stacked, and heating the multilayered structure at the same time or after formation of the multilayered structure, thereby inducing inter-diffusion of the first and the second thin film resulting in an alloy layer including the at least one transition metal and the at least one platinum group element.

The inventors had intensely studied to develop a new magnetic high density recording medium. They paid much attention to the (Fe, Co, Ni)—(Pt, Pd) alloy, and made a number of attempts to synthesize its ordered phase of at lower temperature.

As a result, the inventors developed out the following means. First of all, a (Fe, Co, Ni) layer and a (Pt, Pd) layer are formed independently. Then, this multilayered structure is heated at a given temperature so that Fe, Co and/or Ni in the (Fe, Co, Ni) layer and Pt and/or Pd in the (Pt, Pd) layer are inter-diffused. In this case, the inter-diffusion is performed at a very low temperature of 300–500° C.

Furthermore, they found that, since ordering of the phase is provoked at low temperature as described above, growth of (Fe, Co, Ni) crystal grains is suppressed in the inter-diffusion process resulting in the fine particle structure with the grain size as small as 10–20 nm. This invention was made based on these experimental results.

According to the invention the ambient temperature for alloying of (Fe, Co, Ni) and (Pt, Pd) and ordering is reduced appreciably. Moreover, this low temperature leads to suppression of grain growth resulting in very fine ordered (Fe, Co, Ni) particles. Another advantage is that the substrate temperature for formation and ordering of the alloy can be reduced and the problem of thermal damage is removed making the process coming afterwards easier.

In a preferred embodiment of the present invention, the first layer is of a granular structure including a transition metal and the second layer is of a granular structure including a platinum group element.

In another preferred embodiment of the present invention, the first layer is of a granular structure made of a transition metal alloy that includes at least one transition element and the second layer is a platinum group alloy that includes at least one platinum group element.

In the another preferred embodiment of the present invention, the first layer is of a transition metal alloy that includes at least one transition element and the second layer is of a granular structure made of a platinum group alloy that includes at least one platinum group element.

As mentioned above, in the preferred embodiment of the present invention, at least one of the two layers, one of which is made of at least one element selected from transition group of Fe, Co and N, and another of which is made of at least on element selected from platinum group of Pt and Pd, is of a granular structure.

Therefore, the alloying is performed maintaining this granular structure making easier the process of ordering and formation of (Fe, Co, Ni) fine particle assembly, In the other preferred embodiment of the invention, Ag is used as a matrix for the granular structure in either the first or the second granular layer. In this case, the ordering temperature is reduced more, namely, 200–400° C.

In the other preferred embodiment of the invention, Ag particles are added to the granular structure in either the first or the second granular layer. In this case, the ordering temperature is reduced more, namely, 200–400° C.

The term [granular] collectively means a structure composed of a matrix of oxide, nitride or fluoride and the particles depressed in them. Subsequently, in the recording medium produced according to the present invention the ordered alloy particles of (Fe, Co, Ni) are dispersed in the matrix mentioned above.

DESCRIPTION OF THE PREFERRED EMBODIMENTS

This invention will be described in detail. In the case that the first layer is a transition metal granular structure containing at least one of Co, Fe and Ni, and the second layer is a platinum group granular structure containing at least one of Pt and Pd, according to the preferred embodiment of the present invention, the thickness of the transition metal granular layer is preferably set within 1.0–20 nm, particularly within 2.5–5.0 nm.

Similarly, the thickness of the platinum group granular layer is preferably set within 1.0–20 nm, particularly within 2.5–5.0 nm. In this case, the sizes of the (Fe, Co, Ni)—(Pt, Pd) alloy particles can be reduced when the (Fe, Co, Ni)—(Pt, Pd) alloy particles are made by fabricated utilizing the inter-diffusion of the between the first and the second layers. Moreover, the coercive force of the resulting magnetic recording medium composed of the (Fe, Co, Ni)—(Pt, Pd) alloy particles can be enhanced sufficiently, and recorded data can be maintained stably for a long period of time.

The content of the transition metal fine particles in the transition metal granular layer is preferably set within 20–90 atomic percentages, particularly within 40–80 atomic percentages. Similarly, the content of the platinum group granular layer is preferably set within 20–90 atomic percentages, particularly within 40–80 atomic percentages.

In this case, the (Fe, Co, Ni)—(Pt, Pd) alloy particles can be isolated sufficiently from each other, so that the coercive force of the magnetic recording medium including the (Fe, Co, Ni)—(Pt, Pd) alloy particles of the present invention is increased. Therefore, the higher density recording can be easily realized and a long-term reliable magnetic recording medium can be obtained.

The average diameter of the transition metal fine particles of the transition metal granular layer is preferably set within 1.0–10 nm, particularly within 3–5 nm. Similarly, the average diameter of the platinum group fine particles of the platinum group granular layer is preferably set within 1.0–10 nm, particularly within 3–5 nm.

In this case, the coercive force of the resulting magnetic recording medium including the (Fe, Co, Ni)—(Pt, Pd) alloy particles of ordered phase can be enhanced sufficiently because the sizes of the particles can be reduced sufficiently. As a result, the high density recording can be easily realized, and then, recorded information can be maintained for a long period of time.

In the case that the first layer is a transition metal granular thin film composed of transition metal fine particles made of at least one of Co, Fe and Ni and the second layer is a platinum group thin film made of at least one of Pt and Pd, according to the preferred embodiment, the thickness of the transition metal granular layer is preferably set within 1.0–20 nm, particularly within 2.5–5.0 nm.

Similarly, the thickness of the platinum group layer is preferably set within 0.2–18 nm, particularly within 0.5–4.5 nm. In this case, the (Fe, Co, Ni)—(Pt, Pd) alloy particles can be isolated from one another in the magnetic recording medium so that the coercive force can be easily enhanced. As a result, the high density recording can be realized and a long-term realiable magnetic recording medium can be provided.

The content of the transition metal fine particles in the transition metal granular layer is preferably set within 20–90 atomic percentages, particularly within 40–80 atomic percentages. In this case, the sizes of the (Fe, Co, Ni)—(Pt, Pd) alloy particles can be reduced when the (Fe, Co, Ni)—(Pt, Pd) alloy particles are made by utilizing the inter-diffusion of the multilayered structure. As a result, the coercive force of the resulting magnetic recording medium including the (Fe, Co, Ni)—(Pt, Pd) alloy particles can be enhanced sufficiently. Accordingly, the higher density recording can be realized, and a long-term reliable magnetic recording medium can be provided.

The average diameter of the transition metal fine particles of the transition metal granular layer is preferably set within 1.0–10 nm, particularly within 2.5–5 nm. In this case, the coercive force of the resulting magnetic recording medium including the (Fe, Co, Ni)—(Pt, Pd) alloy particles of ordered phase can be enhanced sufficiently because the sizes of the particles can be reduced sufficiently. As a result, the high density recording can be easily realized, and then, recorded information can be maintained for a long period of time.

In the case that the first layer is a transition metal thin film made of at least one of Co, Fe, and Ni, and the second layer is a platinum group granular thin film composed of platinum group fine particles made of at least one of Pt and Pd, the thickness of the platinum group granular thin film is preferably set within 1.0–20 nm, particularly within 2.5–5.0 nm.

Similarly, the thickness of the transition metal layer is preferably set within 0.2–18 nm, particularly within 0.5–4.5 nm. In this case, the (Fe, Co, Ni)—(Pt, Pd) alloy particles of ordered phase can be isolated sufficiently from each other in the magnetic recording medium, and the coercive force of the magnetic recording medium can be increased. Therefore, the high density recording can be realized easily, and the long-term reliability of the magnetic recording medium can be enhanced.

The content of the platinum group fine particles in the platinum group granular layer is preferably set within 20–90 atomic percentages, particularly within 40–80 atomic percentages. In this case, the platinum group fine particles can be isolated sufficiently from one another in the magnetic recording medium, and the coercive force of the magnetic recording medium can be enhanced. Therefore, the high density recording can be realized and the long-term reliability of the magnetic recording medium can be provided.

The average diameter of the platinum group fine particles of the platinum group granular thin film is preferably set within 1.0–10 nm, particularly within 3–5 nm. In this case, the sizes of the platinum group granular layer can be reduced sufficiently, and the coercive force of the magnetic recording medium including the platinum group fine particles can be enhanced sufficiently. As a result, the high density recording can be realized and recorded data can be maintained for a long period of time.

In all of the preferred embodiments as mentioned above, he first layer and the second layer are stacked to form a double layer structure. In this case, the multilayered structure may be composed of only one first layer and only one second layer, but another embodiment is that deposition of the first and the second layers is alternately repeated to form a more than quartet multilayer structure.

In all of the preferred embodiments as mentioned above it is desired that Ag are contained in the granular layer. Thus the thermal treatment to form the (Fe, Co, Ni)—(Pt, Pd) alloy particles of ordered phase can be carried out at much lower temperature.

The Ag is preferably contained in the granular layer within the range of 5–80 atomic percentages, preferably 10–20 atomic percentages. Also, the average diameter of the Ag particles is preferably set within 5–20 nm, particularly within 5–10 nm. The Ag is contained in at least one of the transition metal granular layer and the platinum group granular layer.

In the present invention, the multilayered structure made of the first layer and the second layer is heated at a given temperature, preferably within 300–500° C. In this case, the above (Fe, Co, Ni)—(Pt, Pd) alloy particles of ordered phase can be made. Particularly, in the case that Ag is contained in the granular thin film, the (Fe, Co, Ni)—(Pt, Pd) alloy particles can be made within 200–400° C.

The time of thermal treatment is preferably set within 0.5–2 hours, depending on the thicknesses of the first and the second layer, and the like.

As for the oxide matrix of the granular thin film, an oxide including at least one of Mg, Si, Al, In, B and rare earth metal may be exemplified. Similarly, as for the nitride or the fluoride matrix of the granular thin film, a nitride or a fluoride including at least one of Mg, Si, Al, In B and rare earth metal may be exemplified.

In addition, the matrix of the granular layer may be made of Ag. In this case, the (Fe, Co, Ni)—(Pt, Pd) alloy particles can be made at much lower temperature. Concretely, the alloy can be made within 200–400° C. when Ag is contained.

Through the fabrication process as mentioned above, the average diameter of the (Fe, Co, Ni)—(Pt, Pd) alloy particles can be reduced to 10 nm or below, and the coercive force of the magnetic recording medium including the (Fe, Co, Ni)—(Pt, Pd) alloy particles can be enhanced to 5 KOe or over. There-fore, the recording density and the long-term reliability can be more enhanced. In order to prevent the super paramagnetism, the average diameter of the (Fe, Co, Ni)—(Pt, Pd) alloy particles is preferably set to 3 nm or over.

EXAMPLES

This invention will be described concretely hereinafter.

Example 1

A Fe granular layer composed of a MgO matrix and Fe microparticles dispersed in the matrix a Pt granular layer composed of a MgO matrix and Pt mircoparticles dispersed in the matrix were prepared. These two Fe granular layers and two Pt granular layer were alternately deposited to form a multilayered structure, which was thermal treated for one hour.

The thermal treatment was performed at 350° C. and 400° C. The volume percentage of the Fe particles in the Fe granular layer and the volume percentages of the Pt granular layer were set to the same value "P" and the thicknesses of the Fe granular thin film and the Pt granular thin film were set to the same value "d". Subsequently the average diameters of the Fe particles and the pt particles were 5 nm, respectively.

The above-mentioned thermal treatment temperatures were appropriately selected, and the volume percentages P and the thickness d were varied, to fabricate various kinds of magnetic recording medium. Then, the average size of alloy particles the coercive force and the resistivity of medium were measured. The results are listed in Table 1. It turned out from micro EDX observation that all of the samples, the Fe and Pt fine particles were alloyed by inter-diffusion.

TABLE 1

| p | d (nm) | Thermal treatment temperature (° C.) | D (nm) | Hc (KOe) | ρ (μΩ cm) |
|---|---|---|---|---|---|
| 0.5 | 2.5 | 350 | 6.5 | 7.2 | >10$^5$ |
| 0.5 | 2.5 | 400 | 8.8 | 8.8 | >10$^5$ |
| 0.5 | 1.0 | 350 | 5.6 | 5.4 | >10$^5$ |
| 0.5 | 1.0 | 400 | 6.7 | 7.1 | >10$^5$ |
| 0.8 | 2.5 | 350 | 10.0 | 9.0 | 500 |
| 0.8 | 2.5 | 400 | 13.4 | 12.6 | 420 |

As is apparent from Table 1 the average diameters D of the FePt alloy particle were around 10 nm and thus, the FePt alloy particles are downsized sufficiently. It also turned out that the samples have large resistivities, and thus, the FePt alloy particles are isolated from each other. Moreover, the samples have large coercive forces of 5 KOe or over, suggesting the FePt particles are ordered. The ordered phases were confirmed from X-ray analysis for a sample fabricated on a Si substrate with an underlayer make of chromium in the same manner as mentioned above.

All of the thus obtained magnetic recording media have the FePt particles with average diameters of around 10 nm and have large coercive forces of 5KOe or over. In these magnetic recording media, therefore, high density recording can be performed, and recorded data can be maintained for a long period of time.

Example 2

A Fe granular layer composed of a MgO matrix and Fe fine particles dispersed in the matrix and a Pt granular layer composed of a MgO matrix and Pt fine particles dispersed in the matrix were prepared. Then, two Fe granular films and two Pt granular film were alternately deposited to form a multilayered structure, which was thermal treated at 350° C. and 400° C. for one hour. The volume percentage P of the Fe fine particles was set to 0.5, and the thickness dg of the Fe granular layer was set to 2.0 nm, and the thickness dp of the Pt granular layer was set to 1.0 nm. Subsequently, the average diameter of the Fe fine particles was 5 nm. The results are listed in Table 2.

In this case, too, it was turned out from micro EDX observation that the Fe fine particles and the Pt fine particles were alloyed by inter-diffusion.

TABLE 2

| p | Thermal treatment temperature (° C.) | dp (nm) | dg (nm) | D (nm) | Hc(KOe) | ρ (μΩ cm) |
|---|---|---|---|---|---|---|
| 0.5 | 350 | 1.0 | 2.0 | 8.0 | 7.2 | >10$^5$ |
| 0.5 | 400 | 1.0 | 2.0 | 10.0 | 8.8 | ~10$^3$ |

As is apparent from Table 2, the average diameters D of the FePt alloy particles in the samples were around 10 nm and thus, the FePt alloy particles are downsized sufficiently. The samples have large resistivities, suggesting the FePt alloy particles are isolated sufficiently from each other. Moreover, the samples have large coercive forces of 5 KOe or over, suggesting the FePt alloy particles are ordered. The ordered phases were confirmed from X-ray analysis for a sample medium fabricated on a Si substrate with an under-layer made of chromium in the same manner as mentioned above.

In this example, all of the samples have the FePt particles with average diameters of around 10 nm and have large coercive forces of 5 KOe or over. In the magnetic recording media, therefore, high density recording can be performed, and recorded data can be maintained for a long period of time.

Example 3

A Fe granular layer composed of a MgO matrix and Fe microparticles dispersed in the matrix and a Pt granular layer composed of a MgO matrix and Pt mircoparticles dispersed in the matrix were prepared. Then, two Fe granular films and two Pt granular film were alternately deposited to form a multilayered structure, which was thermal treated at 350° C. and 400° C. for one hour. The volume percentages P of the Fe fine particles and the Pt fine particles were set to 0.5, and the thickness dg of the Fe granular thin film was set to 2.0 nm, and the thickness dp of the Pt granular thin film was set to 5.0 nm, 2.0 nm or 1.0 nm. Subsequently, the average diameter of the Pt fine particles was 5 nm. The results are listed in Table 3.

In this case, too, it turned out from micro EDX observation that the Fe fine particles and the Pt fine particles were alloyed by inter-diffusion.

TABLE 3

| p | Thermal treatment temperature (° C.) | dp (nm) | dg (nm) | D (nm) | Hc(KOe) | ρ (μΩ cm) |
|---|---|---|---|---|---|---|
| 0.5 | 350 | 2.5 | 5.0 | 6.0 | 3.5 | ρ > 10$^5$ |
| 0.5 | 400 | 2.5 | 5.0 | 8.0 | 5.0 | ρ > 10$^5$ |
| 0.5 | 350 | 1.0 | 2.0 | 8.0 | 5.4 | ρ > 10$^5$ |
| 0.5 | 400 | 1.0 | 1.0 | 10.0 | 8.3 | ~10$^3$ |

As is apparent from Table 3 the average diameters D of the FePt alloy particles in samples were around 10 nm and thus, the FePt alloy particles are downsized sufficiently. It is also turned out that the magnetic recording media have large resistivities, and thus, the FePt alloy particles are isolated sufficiently from each other.

Moreover, it turned out that when the sample with thickness dg is 5.0 nm for the Pt granular thin film and the thickness dp≦2.5 nm for the Fe granular thin film was annealed at 350° C., a relatively small coercive force of 3.5 KOe was obtained, but after heat treatment at high temperatures, large coercive forces of 5 KOe or over were available. Therefore, the FePt alloy particle are well ordered. The ordered phases were confirmed from X-ray analysis for a sample fabricated on a Si substrate with an underlayer made of chromium in the same manner as mentioned above.

In this example, almost all of the magnetic recording media have FePt particles with average diameters of around 10 nm and have large coercive forces of 5 KOE or over. In these magnetic recording media, therefore, high density recording can be performed, and recorded data can be maintained for a long period of time.

Although the present invention was described in detail with reference to the above examples, this invention is not limited to the above disclosure and every kind of variation and modification may be made without departing from the scope of the present invention.

As mentioned above, a new magnetic recording medium which can fulfill the requirement of high density recording can be provided, according to the present invention.

What is claimed is:

1. A method for fabricating a magnetic recording medium, comprising the steps of:

preparing a first granular thin film including fine particles made of at least one transition metal selected from the group consisting of Co, Fe and Ni, and a second granular thin film including fine particles made of at least one platinum group element selected from the group consisting of Pt and Pd, forming a multilayered structure where said first granular thin film and said second granular thin film are stacked, and heating said multilayered structure during or after the formation of said multilayered structure, thereby to inter-diffuse constituent elements of said first granular thin film and said second granular thin film and alloy said at least one transition metal and said at least one platinum group element.

2. A fabricating method as defined in claim 1, wherein said multilayered structure is heated within 300–500° C.

3. A fabricating method as defined in claim 1, wherein the thickness of said first granular thin film is set within 1.0–20 nm, and the thickness of said second granular thin film is set within 1.0–20 nm.

4. A fabricating method as defined in claim 1, wherein the content of said transition metal fine particles in said first granular thin film is set within 20–90 volume percentages, and the content of said platinum group fine particles in said second granular thin film is set within 20–90 volume percentages.

5. A fabricating method as defined in claim 1, wherein the average diameter of said transition metal fine particles is set within 1.0–10 nm, and the average diameter of said platinum group fine particles is set within 1.0–10 nm.

6. A fabricating method as defined in claim 1, wherein a matrix composing at least one of said first granular thin film and said second granular thin film is made of Ag.

7. A fabricating method as defined in claim 6, wherein said multilayered structure is heated within 200–400° C.

8. A fabricating method as defined in claim 1, wherein Ag is contained in at least one of said first granular thin film and said second granular thin film.

9. A fabricating method as defined in claim 8, wherein the average diameter of said Ag is set within 5–20 nm.

10. A fabricating method as defined in claim 8, wherein the content of said Ag is set within 5–80 volume percentages.

11. A fabricating method as defined in claim 8, wherein said multilayered structure is heated within 200–400° C.

12. A fabricating method as defined in claim 1, wherein said magnetic recording medium has a granular structure including microparticles made of an alloy of said at least one transition metal and said at least one platinum group element.

13. A fabricating method as defined in claim 12, wherein the average diameter of said alloy particles are set to 10 nm or below.

14. A fabricating method as defined in claim 12, wherein the coercive force of said magnetic recording medium is 5 KOe or over.

15. A fabricating method as defined in claim 12, wherein said magnetic recording medium includes a matrix made of Ag.

16. A fabricating method as defined in claim 12, wherein said magnetic recording medium includes microparticles made of Ag.

17. A method for fabricating a magnetic recording medium, comprising the steps of:

preparing a granular thin film including fine particles made of at least one transition metal selected from the group consisting of Co, Fe and Ni, and a thin film including at least one platinum group element selected from the group consisting of Pt and Pd, forming a multilayered structure where said transition metal granular thin film and said platinum group thin film are stacked, and heating said multilayered structure during or after the formation of said multilayered structure, thereby to inter-diffuse constituent elements of said transition metal granular thin film and said platinum group thin film and alloy said at least one transition metal and said at least one platinum group element.

18. A fabricating method as defined in claim 17, wherein Ag particles are contained in said transition metal granular thin film.

19. A fabricating method as defined in claim 18, wherein the content of said Ag is set within 5–80 volume percentages.

20. A fabricating method as defined in claim 18, wherein the average diameter of said Ag is set within 5–20 nm.

21. A fabricating method as defined in claim 18, wherein said multilayered structure is heated within 200–400° C.

22. A fabricating method as defined in claim 17, wherein said multilayered structure is heated within 300–500° C.

23. A fabricating method as defined in claim 17, wherein the thickness of said transition metal granular thin film is set within 1.0–20 nm, and the thickness of said platinum group thin film is set within 0.2–18 nm.

24. A fabricating method as defined in claim 17, wherein the content of said transition metal fine particles in said transition metal granular thin film is set within 20–90 volume percentages.

25. A fabricating method as defined in claim 17, wherein the average diameter of said transition metal fine particles is set within 1.0–10 nm.

26. A fabricating method as defined in claim 17, wherein a matrix composing said transition metal granular thin film is made of Ag.

27. A fabricating method as defined in claim 26, wherein said multilayered structure is heated within 200–400° C.

28. A method for fabricating a magnetic recording medium, comprising the steps of:

preparing a thin film including at least one transition metal selected from the group consisting of Co, Fe and Ni, and a granular thin film including fine particles made of at least one platinum group element selected form the group consisting of Pt and Pd, forming a multilayered structure where said transition metal thin film and said platinum group granular thin film are stacked, and heating said multilayered structure during or after the formation of said multilayered structure, thereby to inter-diffuse constituent elements of said transition metal thin film and said platinum group granular thin film and alloy said at least one transition metal and said at least one platinum group element.

29. A fabricating method as defined in claim 28, wherein Ag are contained in said platinum group granular thin film.

30. A fabricating method as defined in claim 29, wherein the content of said Ag is set within 5–80 volume percentages.

31. A fabricating method as defined in claim 30, wherein the average diameter of said Ag is set within 5–20 nm.

32. A fabricating method as defined in claim 29, wherein said multilayered structure is heated within 200–400° C.

33. A fabricating method as defined in claim 28, wherein said multilayered structure is heated within 300–500° C.

34. A fabricating method as defined in claim 28, wherein the thickness of said transition metal thin film is set within 0.2–18 nm, and the thickness of said platinum group granular thin film is set within 1.0–20 nm.

35. A fabricating method as defined in claim 28, wherein the content of said platinum group fine particles in said platinum group granular thin film is set within 20–90 volume percentages.

36. A fabricating method as defined in claim 28, wherein the average diameter of said platinum group fine particles is set within 1.0–10 nm.

37. A fabricating method as defined in claims 28, wherein a matrix composing said platinum group granular thin film is made of Ag.

38. A fabricating method as defined in claim 37, wherein said multilayered structure is heated within 200–400° C.

* * * * *